United States Patent
Zhou et al.

(10) Patent No.: US 11,806,912 B2
(45) Date of Patent: Nov. 7, 2023

(54) MODIFIED THERMOPLASTIC POLYURETHANES AND METHODS OF EXTRUDING SAME

(71) Applicant: Kimberly-Clark Worldwide, Inc., Neenah, WI (US)

(72) Inventors: Peiguang Zhou, Suwanee, GA (US); Davis Dang Hoang Nhan, Menasha, WI (US); Wen Yuan, Mountain Lakes, NJ (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 18/017,945

(22) PCT Filed: Jul. 29, 2021

(86) PCT No.: PCT/US2021/043590
§ 371 (c)(1),
(2) Date: Jan. 25, 2023

(87) PCT Pub. No.: WO2022/035605
PCT Pub. Date: Feb. 17, 2022

(65) Prior Publication Data
US 2023/0211536 A1  Jul. 6, 2023

Related U.S. Application Data

(60) Provisional application No. 63/064,430, filed on Aug. 12, 2020.

(51) Int. Cl.
*B29C 48/29* (2019.01)
*B29C 48/00* (2019.01)
(Continued)

(52) U.S. Cl.
CPC ............ *B29C 48/29* (2019.02); *B29C 48/022* (2019.02); *C08J 3/24* (2013.01); *C08L 75/04* (2013.01);
(Continued)

(58) Field of Classification Search
CPC .. C08L 75/04; C08J 3/24; B29C 48/91; B29C 35/02; B29C 48/022; B29C 48/29
See application file for complete search history.

(56) References Cited

U.S. PATENT DOCUMENTS

| | | |
|---|---|---|
| 4,374,177 A | 2/1983 | Hsu et al. |
| 4,825,487 A | 5/1989 | Eberl |

(Continued)

FOREIGN PATENT DOCUMENTS

| | | |
|---|---|---|
| CN | 101550615 A | 10/2009 |
| CN | 101624469 A | 1/2010 |

(Continued)

OTHER PUBLICATIONS

International Search Report and Written Opinion for Patent Application PCT/US2021/043590 dated Nov. 22, 2021; 9 pp.

(Continued)

*Primary Examiner* — Stella K Yi
(74) *Attorney, Agent, or Firm* — Armstrong Teasdale LLP

(57) ABSTRACT

Described herein are modified thermoplastic polyurethanes, methods of reactively extruding the modified thermoplastic polyurethanes, and methods of using the modified thermoplastic polyurethanes. The modified thermoplastic polyurethanes are micro-crosslinked through reaction with a functional polyolefin, have significantly improved tensile strength and elongation compared to unmodified thermoplastic polyurethanes, and may be extruded.

17 Claims, 2 Drawing Sheets

(51) Int. Cl.
*C08J 3/24* (2006.01)
*C08L 75/04* (2006.01)
*B29K 75/00* (2006.01)

(52) U.S. Cl.
CPC ....... *B29K 2075/00* (2013.01); *C08J 2375/04* (2013.01)

(56) References Cited

U.S. PATENT DOCUMENTS

| | | |
|---|---|---|
| 9,982,132 B2 | 5/2018 | Hoej et al. |
| 2002/0107550 A1 | 8/2002 | Amely-Velez |
| 2015/0141567 A1* | 5/2015 | Hoej ....................... C08L 23/12 |
| | | 525/123 |

FOREIGN PATENT DOCUMENTS

| | | |
|---|---|---|
| CN | 103789864 A | 5/2014 |
| CN | 109868516 A | 6/2019 |
| EP | 0671502 A1 | 9/1995 |
| EP | 3253824 A1 | 12/2017 |
| FR | 1444781 A | 7/1966 |
| JP | 2007504295 A | 3/2007 |
| KR | 101397367 B1 | 5/2014 |

OTHER PUBLICATIONS

Xu, Zhaozan et al., "Synthesis and Properties of Micro-crosslinked Poly-propylene Glycol Based Polyurethane Elastomer," Materials Reports, vol. 34, Issue 16, 2020; https://doi.org/10.11896/cldb.19110165; pp. 16172-16176.

Lu, Qi-wei, Thermoplastic polyurethane (TPU)/polyolefin (PO) blends; Nanjing University of Science and Technology; 2003.

\* cited by examiner

MODIFIED THERMOPLASTIC POLYURETHANES AND METHODS OF EXTRUDING SAME

CROSS-REFERENCE TO RELATED APPLICATIONS

This application is a U.S. National Phase Application of PCT/US2021/043590, filed Jul. 29, 2021, which claims the benefit of priority to U.S. Provisional Application Ser. No. 63/064,430, filed on Aug. 12, 2020, the contents of which are hereby incorporated by reference in their entirety.

FIELD OF DISCLOSURE

The present disclosure is generally directed to modified thermoplastic polyurethanes, methods of reactively extruding the modified thermoplastic polyurethanes, and methods of using the modified thermoplastic polyurethanes. The modified thermoplastic polyurethanes are micro-crosslinked, have significantly improved tensile strength and elongation compared to unmodified thermoplastic polyurethanes, and may be extruded.

BACKGROUND

Thermoset polyurethane fibers such as spandex/Lycra® are known for their excellent elasticity. However, they are not melt processable due to their chemically crosslinked nature. As a result, it is impossible to make CD stretchable elastic laminates such as spandex through extrusion of thermoset polyurethane.

Elastic thermoset materials such as spandex are also expensive. This is in part due to the wet chemistry methods required for thermoset materials. In contrast, thermoplastic polyurethane (TPU) can be extruded at a much lower cost.

Modification of elastic thermoplastic materials to achieve an extrudable material is known in the art. However, a high degree of the chemical crosslinking typically imparted through modification results in generation of gels or blocking of the extruder during high speed extrusion processes.

Currently, there is no suitable method in the art to extrude modified thermoplastic polyurethanes. Regardless, a high speed extrusion process is highly desirable to improve the physical properties of elastic thermoplastic polyurethanes and lower their production costs.

Described herein are modified thermoplastic polyurethanes and methods of producing modified thermoplastic polyurethanes. An extrudable, modified thermoplastic polyurethane of the present disclosure is obtained with micro-crosslinking. This micro-crosslinking greatly increases the tensile strength and elongation of the modified thermoplastic polyurethane while also not leading to gelling during extrusion.

Compositions and methods in accordance with the present disclosure are useful in a variety of consumer products that include elastic articles. Generally speaking, the present disclosure is directed to thermoplastic polyurethane elastomer compositions used in films or other articles, where articles made using the compositions have increased tensile strength and elasticity in the machine direction (MD), cross-machine direction (CD), or both.

The compositions can be used in films, laminates, packaging, personal care articles, and in any other suitable application. In one exemplary application, the compositions can be used in an absorbent article that is capable of absorbing water or other fluids. Examples of some absorbent articles include, but are not limited to, personal care absorbent articles, such as diapers, training pants, absorbent underpants, adult incontinence articles, feminine hygiene products (e.g., sanitary napkins), swim wear, baby wipes, mitt wipes, and so forth; medical absorbent articles, such as garments, fenestration materials, underpads, bandages, absorbent drapes, and medical wipes; food service wipers; clothing articles; and so forth. Stronger MD/CD elastics with good elastic properties are particularly important for product applications such as materials for diaper ears or side panels for pants.

BRIEF DESCRIPTION OF THE DISCLOSURE

In one embodiment of the present disclosure, a modified thermoplastic polyurethane includes a polyurethane backbone and a crosslinker comprising a functional polyolefin. The modified thermoplastic polyurethane is extrudable.

In another embodiment of the present disclosure, a method of reactively extruding a modified thermoplastic polyurethane includes (i) pre-compounding a mixture including a molten polymer including a polyurethane backbone and a molten crosslinker including a functional polyolefin, and (ii) extruding the mixture. The polymer including a polyurethane backbone, specifically the polyurethane linkage of the polyurethane backbone, reacts with the crosslinker including a functional polyolefin during the method step of extruding the mixture and the mixture does not gel or block the extruder during the method step of extruding the mixture.

In yet another embodiment of the present disclosure, a method uses a modified thermoplastic polyurethane including a polyurethane backbone and a crosslinker including a functional polyolefin, where the modified thermoplastic polyurethane is extrudable. The method includes using the modified thermoplastic polyurethane to increase tensile strength and/or elongation in a consumer product.

DETAILED DESCRIPTION OF THE DISCLOSURE

Figure 1:
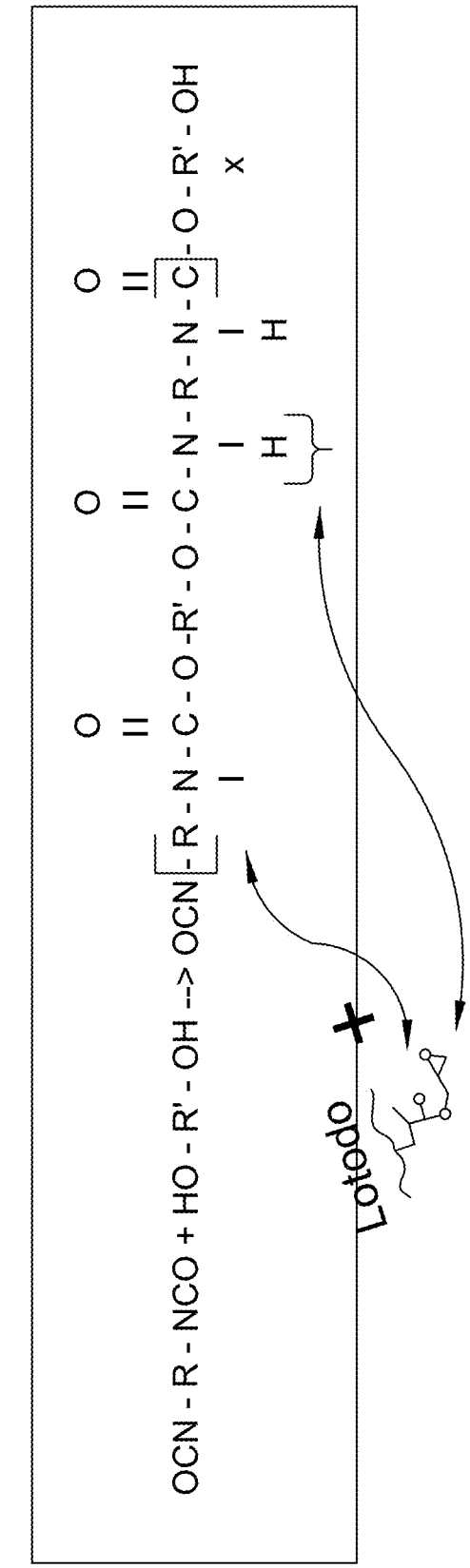
FIG. 1 is an exemplary embodiment depicting microdomain crosslinking of a thermoplastic polyurethane in accordance with the present disclosure. The crosslinking could happen either inter or intra polyurethane chain(s).

Generally speaking, the present disclosure relates to multiple embodiments of modified thermoplastic polyurethanes comprising micro-crosslinking groups that improve the properties of the modified thermoplastic polyurethanes. The micro-crosslinking groups may form intramolecular and intermolecular covalent bonds with the same or different thermoplastic polyurethanes. Many embodiments of the modified thermoplastic polyurethanes disclosure herein are extrudable and melt processable.

Thermoplastic polyurethane (TPU) is a linear segmented block copolymer comprising hard and soft segments. The hard segment may comprise aromatic isocyanates or aliphatic isocyanates, where these isocyanates are combined with short-chain diols. The soft segment may comprise a polyether polyol or a polyester polyol.

Unmodified TPUs are elastomers that are fully thermoplastic. Thus, unmodified TPUs are elastic and melt-processable. They can be processed via extrusion molding, injection molding, blow molding, compression molding, as well as via solution coating or foaming.

Described herein is a modified thermoplastic polyurethane comprising a polyurethane backbone and a crosslinker comprising a functional polyolefin, wherein the modified thermoplastic polyurethane is extrudable. The polyurethane backbone has at least one polyurethane linkage.

In some embodiments, the crosslinker comprising a functional polyolefin crosslinks the modified thermoplastic polyurethane with itself or with an additional thermoplastic polyurethane. In other words, the polyurethane backbone is intramolecularly bonded, intermolecularly bonded, or both intramolecularly bonded and intermolecularly bonded by the crosslinker comprising a functional polyolefin. These bonds impart unique properties to the modified thermoplastic polyurethane.

In some embodiments, the polyurethane backbone is intramolecularly bound by the crosslinker comprising a functional polyolefin. The polyurethane backbone may comprise at least two atoms that are covalently bonded by the crosslinker comprising a functional polyolefin. The polyurethane backbone may comprise a first atom covalently bonded by the crosslinker comprising a functional polyolefin to a second atom in the polyurethane backbone.

In some embodiments, the polyurethane backbone is intermolecularly bonded to another thermoplastic polyurethane comprising a polyurethane backbone by the crosslinker comprising a functional polyolefin. In the presence of an additional thermoplastic polyurethane, the polyurethane backbone may comprise at least one atom covalently bound by the crosslinker to at least one atom of the additional thermoplastic polyurethane.

A number of different types of thermoplastic polyurethanes may be useful in the modified thermoplastic polyurethanes. Two common groups of useful thermoplastic polyurethanes include aliphatic thermoplastic polyurethanes and aromatic thermoplastic polyurethanes.

In some embodiments, the modified thermoplastic polyurethane is an aliphatic thermoplastic polyurethane. The modified thermoplastic polyurethane may comprise an aliphatic polyurethane linkage selected from the group consisting of —R—NH—CO—, where R is an aliphatic group.

In some embodiments, the modified thermoplastic polyurethane is an aromatic thermoplastic polyurethane. The modified thermoplastic polyurethane may comprise an aromatic polyurethane linkage selected from the group consisting of R—NH—COO—, where R is an aromatic group.

In some embodiments, the polyurethane backbone comprises a polyurethane linkage selected from the group consisting of R—NH—COO—R', R—NH—CO—NH—R', and combinations thereof. In these embodiments, R and R' are each independently selected from the group consisting of aliphatic groups, aromatic groups, and combinations thereof.

In some embodiments, the polyurethane backbone comprises a hard segment and a soft segment. In some embodiments, the crosslinker comprising a functional polyolefin reinforces the hard segment of the polyurethane backbone.

In some embodiments, the crosslinker comprising a functional polyolefin has a relatively high melt index. The crosslinker comprising a functional polyolefin may have a melt index in the range of from about 1 to about 200 g/10 min. Melt index is the flow measurement of the polymer being pushed at 190° C. with 2.16 kg mass. The result is expressed in grams per 10 minutes (g/10 min). Melt index can be determined according to ISO 1133/ASTM D1238.

In some embodiments, the crosslinker comprising a functional polyolefin is selected from the group consisting of reactive random polymers, maleic anhydride, glycidyl methacrylate, random terpolymers of ethylene, acrylic maleic anhydride, glycidyl methacrylate, and combinations thereof. The crosslinker comprising a functional polyolefin may impart epoxide functionality.

In some embodiments, the functional polyolefin comprises a functional group selected from the group consisting of an epoxide group, an organic acid, a carboxylic acid, an isocyanate, a blocked isocyanate, an amine, a urea, and combinations thereof. In some embodiments, the functional polyolefin comprises an epoxide group.

Regarding the functional polyolefin, it has been discovered that polyepoxides having a relatively low epoxy functionality can be particularly effective in the modified thermoplastic polyurethanes. The relatively low epoxy functionality is quantifiable by the epoxy equivalent weight. The epoxy equivalent weight reflects the amount of resin that contains one molecule of an epoxy group, and it can be calculated by dividing the number average molecular weight of the modifier by the number of epoxy groups in the molecule.

The polyepoxide of the present disclosure typically has a number average molecular weight in the range of from about 7,500 to about 250,000 g/mol, in some embodiments in the range of from about 15,000 to about 150,000 g/mol, and in some embodiments, in the range of from about 20,000 to 100,000 g/mol, with a polydispersity index typically ranging from 2.5 to 7. The polyepoxide can contain less than 50, in some embodiments in the range of from 5 to 45, and in some embodiments, in the range of from 15 to 40 epoxy groups. In turn, the epoxy equivalent weight can be less than about 15,000 g/mol, in some embodiments in the range of from about 200 to about 10,000 g/mol, and in some embodiments, in the range of from about 500 to about 7,000 g/mol.

The polyepoxide can be a linear or branched, homopolymer or copolymer (e.g., random, graft, block, etc.) containing terminal epoxy groups, skeletal oxirane units, and/or pendent epoxy groups. The monomers employed to form such polyepoxides can vary. In one specific embodiment, for example, the polyepoxide contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers can include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it not only results in chain extension, but also helps to achieve the desired blend morphology. The resulting melt flow rate of the polymer is thus typically within a range of from about 5 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

The polyepoxide also typically includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Especially desirable α-olefin comonomers are ethylene and propylene. Another suitable monomer can include a (meth)acrylic monomer that is not epoxy-functional. Examples of such (meth)acrylic monomers can include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In some embodiments, the polyepoxide is a terpolymer formed from an epoxy-functional (meth)acrylic monomeric component, α-olefin monomeric component, and non-epoxy functional (meth)acrylic monomeric component. For example, the polyepoxide can be poly(ethylene-co-methylacrylate-co-glycidyl methacrylate), which has the following structure:

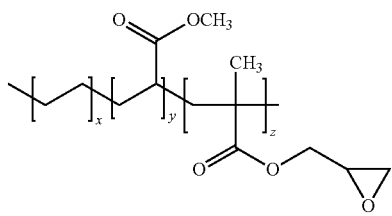

wherein, x, y, and z are at least 1.

The epoxy functional monomer can be formed into a polymer using a variety of known techniques. For example, a monomer containing polar functional groups can be grafted onto a polymer backbone to form a graft copolymer. Such grafting techniques are well known in the art and described, for instance, in U.S. Pat. No. 5,179,164. In other embodiments, a monomer containing epoxy functional groups can be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) can be selected to achieve a balance between epoxy-reactivity and melt flow rate. More specifically, high epoxy monomer content can result in good reactivity, but too high of a content can reduce the melt flow rate to such an extent that the polyepoxide adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) can likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) can constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide that can be used in the present disclosure is commercially available from Arkema as LOTADER AX8950 or AX8900 or AX8700 brand polyepoxide. LOTADER AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %. Another suitable polyepoxide is commercially available from DuPont ELVALOY PTW brand polyepoxide, which is a terpolymer of ethylene, butyl acrylate, and glycidyl methacrylate and has a melt flow rate of 12 g/10 min.

In addition to controlling the type and relative content of the monomers used to form the polyepoxide, the overall weight percentage can also be controlled to achieve the desired benefits. For example, if the modification level is too low, the desired increase in melt strength and mechanical properties cannot be achieved. It has also been discovered, however, that if the modification level is too high, processing can be restricted due to strong molecular interactions (e.g., crosslinking) and physical network formation by the epoxy functional groups. Thus, the polyepoxide is typically employed in an amount of from about 1.0 wt. % to about 15 wt. %, in some embodiments from about 2.0 wt. % to about 10 wt. %, in some embodiments from about 3.0 wt. % to about 8 wt. %, and in some embodiments, from about 1 wt. % to about 5 wt. %, based on the weight of the polyolefin elastomers employed in the composition. The polyepoxide can also constitute from about 1 wt. % to about 10 wt. %, in some embodiments from about 2 wt. % to about 8 wt. %, in some embodiments from about 3.0 wt. % to about 6 wt. %, and in some embodiments based on the total weight of the composition.

In many embodiments, the crosslinker acts as a micro-crosslinker. Micro-crosslinking means that the crosslinker is present in a low crosslinking density and only limited amounts of functional groups can be used for micro-crosslinking.

The modified thermoplastic polyurethane generally has a low crosslinking density. In many embodiments, the modified thermoplastic polyurethane has a crosslinking density greater than 0%.

In some embodiments, the modified thermoplastic polyurethane has a crosslinking density of less than about 0.25%. In some embodiments, the modified thermoplastic polyurethane has a crosslinking density of greater than about 0.25%. In some embodiments, the modified thermoplastic polyurethane has a crosslinking density of less than about 0.5%. In some embodiments, the modified thermoplastic polyurethane has a crosslinking density of less than about 1%. In some embodiments, the modified thermoplastic polyurethane has a crosslinking density of less than about 1.5%. In some embodiments, the modified thermoplastic polyurethane has a crosslinking density of less than about 2%. In some embodiments, the modified thermoplastic polyurethane has a crosslinking density of no more than about 3%. In some embodiments, the modified thermoplastic polyurethane has a crosslinking density of less than about 4%. In some embodiments, the modified thermoplastic polyurethane has a crosslinking density of less than about 5%.

In one embodiment, the modified thermoplastic polyurethane has a crosslinking density of less than about 1%. In another embodiment, the modified thermoplastic polyurethane has a crosslinking density of no more than about 2%.

In many embodiments, the modified thermoplastic polyurethane is melt processable in any suitable melt process known in the art. The modified thermoplastic polyurethane may be processed according to a process selected from the group consisting of extrusion molding, injection molding, blow molding, compression molding, foaming, coating, and combinations thereof.

In many embodiments, the modified thermoplastic polyurethane is extrudable in any suitable reactive extrusion process known in the art. The modified thermoplastic polyurethane may be extrudable in a plastic extrusion process. The modified thermoplastic polyurethane may be extrudable in a hot melt extrusion process. The modified thermoplastic polyurethane may be extrudable in a continuous process or a semi-continuous process. The modified thermoplastic polyurethane may be extrudable in a co-extrusion process.

In some embodiments, the modified thermoplastic polyurethane has a tensile strength that is at least about 20% greater than unmodified thermoplastic polyurethanes. In some embodiments, the modified thermoplastic polyurethane has a tensile strength that is at least about 25% greater than unmodified thermoplastic polyurethanes. In some embodiments, the modified thermoplastic polyurethane has a tensile strength that is at least about 30% greater than unmodified thermoplastic polyurethanes. In some embodiments, the modified thermoplastic polyurethane has a tensile strength that is at least about 35% greater than unmodified thermoplastic polyurethanes. In some embodiments, the modified thermoplastic polyurethane has a tensile strength that is at least about 40% greater than unmodified thermoplastic polyurethanes. In some embodiments, the modified thermoplastic polyurethane has a tensile strength that is at least about 50% greater than unmodified thermoplastic polyurethanes.

In some embodiments, the modified thermoplastic polyurethane has an elongation in at least one direction that is at least about 5% greater than unmodified thermoplastic polyurethanes. In some embodiments, the modified thermoplastic polyurethane has an elongation in at least one direction that is at least about 10% greater than unmodified thermoplastic polyurethanes. In some embodiments, the modified thermoplastic polyurethane has an elongation in at least one direction that is at least about 15% greater than unmodified thermoplastic polyurethanes. In some embodiments, the modified thermoplastic polyurethane has an elongation in at least one direction that is at least about 20% greater than unmodified thermoplastic polyurethanes. In some embodiments, the modified thermoplastic polyurethane has an elongation in at least one direction that is at least about 25% greater than unmodified thermoplastic polyurethanes. In some embodiments, the modified thermoplastic polyurethane has an elongation in at least one direction that is at least about 30% greater than unmodified thermoplastic polyurethanes. Importantly, the elongation results in equal or less permanent set compared to the original thermoplastic polyurethane.

In some embodiments, the modified thermoplastic polyurethane has an elongation in at least one direction that is at least about 4% greater than unmodified thermoplastic polyurethanes. In some embodiments, the modified thermoplastic polyurethane has an elongation in at least one direction that is at least about 6% greater than unmodified thermoplastic polyurethanes. In some embodiments, the modified thermoplastic polyurethane has an elongation in at least one direction that is at least about 8% greater than unmodified thermoplastic polyurethanes. In some embodiments, the modified thermoplastic polyurethane has an elongation in at least one direction that is at least about 10% greater than unmodified thermoplastic polyurethanes. In some embodiments, the modified thermoplastic polyurethane has an elongation in at least one direction that is at least about 12% greater than unmodified thermoplastic polyurethanes. In some embodiments, the modified thermoplastic polyurethane has an elongation in at least one direction that is at least about 14% greater than unmodified thermoplastic polyurethanes. In some embodiments, the modified thermoplastic polyurethane has an elongation in at least one direction that is at least about 16% greater than unmodified thermoplastic polyurethanes. In some embodiments, the modified thermoplastic polyurethane has an elongation in at least one direction that is at least about 18% greater than unmodified thermoplastic polyurethanes. In some embodiments, the modified thermoplastic polyurethane has an elongation in at least one direction that is at least about 20% greater than unmodified thermoplastic polyurethanes. In some embodiments, the modified thermoplastic polyurethane has an elongation in at least one direction that is at least about 22% greater than unmodified thermoplastic polyurethanes. Importantly, the elastic modulus of the modified polyurethane is in the same order or softer than the original polyurethane.

Also described herein is a modified thermoplastic polyurethane comprising a polyurethane backbone and a crosslinker comprising a functional polyolefin, wherein the modified thermoplastic polyurethane is produced according to a method comprising (i) pre-compounding a mixture comprising a molten polymer comprising a polyurethane backbone and a molten crosslinker comprising a functional polyolefin, and (ii) extruding the mixture. The polymer comprising a polyurethane backbone reacts with the crosslinker comprising a functional polyolefin during the method step of extruding the mixture and the mixture does not gel or block the extruder during the method step of extruding the mixture.

Also described herein is a method of reactively extruding a modified thermoplastic polyurethane, the method comprising (i) pre-compounding a mixture comprising a molten polymer comprising a polyurethane backbone and a molten crosslinker comprising a functional polyolefin, and (ii) extruding the mixture. The polymer comprising a polyurethane backbone, specifically the polyurethane linkage, reacts with the crosslinker comprising a functional polyolefin during the method step of extruding the mixture and the mixture does not gel or block the extruder during the method step of extruding the mixture.

To form the modified thermoplastic polyurethane elastomer composition, the components are typically blended together using any of a variety of known techniques. In one embodiment, for example, the components can be supplied separately or in combination. For instance, the components can first be dry mixed together to form an essentially homogeneous dry mixture, and they can likewise be supplied either simultaneously or in sequence to a melt processing device that dispersively blends the materials. Batch and/or continuous melt processing techniques can be employed. For example, a mixer/kneader, Banbury mixer, Farrel continuous mixer, single-screw extruder, twin-screw extruder, roll mill, etc., can be utilized to blend and melt process the materials. Especially suitable melt processing devices can be a co-rotating, twin-screw extruder (e.g., ZSK-30 extruder available from Werner & Pfleiderer Corporation of Ramsey, New Jersey or a THERMO PRISM USALAB 16 brand extruder available from Thermo Electron Corp., Stone, England). Such extruders can include feeding and venting ports and provide high intensity distributive and dispersive mixing. For example, the components can be fed to the same or different feeding ports of the twin-screw extruder and melt blended to form a substantially homogeneous melted mixture. If desired, other additives can also be injected into the polymer melt and/or separately fed into the extruder at a different point along its length.

Regardless of the processing technique chosen, the technique results in a melt blended composition. The degree of shear/pressure and heat can be controlled to ensure sufficient dispersion, but not so high as to adversely so that they are incapable of achieving the desired properties. For example, blending typically occurs at a temperature of from about 140° C. to about 210° C., in some embodiments from about 150° C. to about 205° C., in some embodiments, from about 160° C. to about 200° C., and in some embodiments, from about 160° C. to about 180° C. Likewise, the apparent shear rate during melt processing can range from about 10 seconds$^{-1}$ to about 3000 seconds-1, in some embodiments from about 50 seconds$^{-1}$ to about 2000 seconds$^{-1}$, and in some embodiments, from about 100 seconds$^{-1}$ to about 1200 seconds$^{-1}$. The apparent shear rate can be equal to $4Q/R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, can also be controlled to achieve the desired degree of homogeneity.

To achieve the desired shear conditions (e.g., rate, residence time, shear rate, melt processing temperature, etc.), the speed of the extruder screw(s) can be selected with a certain range. Generally, an increase in product temperature is observed with increasing screw speed due to the additional mechanical energy input into the system. For example, the screw speed can range from about 50 to about 400 revolutions per minute ("rpm"), in some embodiments from about 70 to about 300 rpm, and in some embodiments, from about 100 to about 200 rpm. This can result in a temperature that is sufficiently high to disperse the functional polyolefin crosslinker without adversely impacting the size of the polymer chains. The melt shear rate, and in turn the degree to which the additives are dispersed, can also be increased through the use of one or more distributive and/or dispersive mixing elements within the mixing section of the extruder. Suitable distributive mixers for single screw extruders can include, for instance, Saxon, Dulmage, Cavity Transfer mixers, etc. Likewise, suitable dispersive mixers can include Blister ring, Leroy/Maddock, CRD mixers, etc. As is well known in the art, the mixing can be further improved by using pins in the barrel that create a folding and reorientation of the polymer melt, such as those used in Buss Kneader extruders, Cavity Transfer mixers, and Vortex Intermeshing Pin (VIP) mixers.

In some embodiments, the method step of pre-compounding a mixture occurs at a temperature in the range of from about 140° C. to about 210° C. In some embodiments, the method step of pre-compounding a mixture occurs at a temperature in the range of from about 160° C. to about 180° C.

Also described herein is a method of using a modified thermoplastic polyurethane comprising a polyurethane backbone and a crosslinker comprising a functional polyolefin, wherein the modified thermoplastic polyurethane is extrudable. The method comprises using the modified thermoplastic polyurethane to increase at least one of tensile strength and elongation in a consumer product.

The methods of use may increase tensile strength and/or elongation in a consumer product.

The modified thermoplastic polyurethane may be used in a consumer product. In some embodiments, a consumer product comprises the modified thermoplastic polyurethane.

In some embodiments, the consumer product is selected from the group consisting of cloth products, wipes, napkins, disposable bed liners, wound dressings, food packaging, baby and adult diaper products, feminine pads, arm bands, agricultural and pet products, and combinations thereof.

In some embodiments, the consumer product is selected from the group consisting of care absorbent articles, such as diapers, training pants, absorbent underpants, adult incontinence articles, feminine hygiene products (e.g., sanitary napkins), swim wear, baby wipes, mitt wipes, and so forth; medical absorbent articles, such as garments, fenestration materials, underpads, bandages, absorbent drapes, and medical wipes; food service wipers; clothing articles; and so forth. Stronger MD/CD elastics with good elastic properties are particularly important for product applications such as materials for diaper ears or side panels for pants The modified thermoplastic polyurethane may be used in a polymer blend. In one embodiment, a polymer blend comprises the modified thermoplastic polyurethane. In another embodiment, a polymer blend comprises the modified thermoplastic polyurethane and a synthetic or natural polymer selected from the group consisting of polyvinyl chloride (PVC), polycarbonate (PC), polyethylene terephthalate (PET), acrylonitrile-butadiene-styrene (ABS), a polyolefin, polyethylene (PE), polypropylene (PP), polylactic acid (PLA), polyhydroxyalkanoates (PHAs), thermal starch, and combinations thereof.

The modified thermoplastic polyurethane may be used in a composite material. In some embodiments, a composite material comprises the modified thermoplastic polyurethane.

The modified thermoplastic polyurethane may be used in an elastic article. In some embodiments, an elastic article comprises the modified thermoplastic polyurethane used for consumer products as in the articles described above.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

Example 1. Aromatic Thermoplastic Polyurethane

Materials.

As used in this example, Lotader refers to Lotader® AX 8900 or 8700. Lotader® AX is a functional polyolefin. It is a reactive random terpolymer of ethylene, butyl acrylate, and glycidyl methacrylate (epoxide function) produced by Arkema through a high-pressure polymerization process. It contains methyl acrylate content of 24 wt % (as determined by FTIR), glycidyl methacrylate content 8 wt % (as determined by FTIR), and a melt index of 6 g/10 min (190° C./2.16 kg; ISO 1133/ASTM D1238). It can be reacted with —OH, —COOH, —NH$_2$, and —SH.

As used in this example, TPU refers to TPU WHT-F170 from Wanhua Chemical Group Co., Yantai, Shandong 264002, P. R. China. WHT-F170 is an aromatic polyester type polyurethane with Hardness Shore A 72, ASTM D 2240, Density 1.21, ASTM D 792 g/cm$^3$ and melt flow index of 6.0/10 min (190° C./2.16 kg; ISO 1133/ASTM D1238).

Synthesis.

A ZSK-30 extruder (Werner and Pfleidere Corporation, Ramsey, NJ) was used for extrusion. This extruder is a co-rotating, twin screw extruder, with a diameter of 30 mm and screw length up to 1328 mm. The extruder has 14 barrels. Blending occurs at a temperature of from about 140° C. to about 200° C. The screw speed is about 150 rpm.

The samples were processed on a Boy Machine 22D Injection Molder. This model has a 24.2 ton clamping force unit, a 24 mm plasticizing unit, and a shot size of 1.2 oz (PS). The press had an ASTM test specimen mold with four (4) cavities. The temperature profile was 170° C., 175° C., 175° C. and 180° C. for zones 1 through 4. The mold was set at 75° F. and the cycle time was 45 seconds.

Once formed, the specimens were tested for mold shrinkage and tensile properties (ASTM D638). Tensile testing was performed on a Sintech 1/D. Five samples were tested for each film in both the machine direction (MD) and the cross direction (CD). The computer program Test Works 4 was used to collect data during testing and to generate a stress versus strain curve from which a number of properties were determined, including modulus, peak stress, elongation, and toughness.

Tensile Testing.

The modified TPU is tested for tensile properties (e.g. peak stress, modulus, strain at break, and energy per volume at break). These measurements are performed using a strip elongation test which is substantially in accordance with the specifications in ASTM D5459-95. Specifically, the test uses two clamps each having two jaws with each jaw having a facing in contact with the sample. The clamps hold the material in the same plane usually vertically, separated by 1 inch and move the cross head at a specific rate of extension. A dog bone-sized sample of modified TPU was made through injection molding, with a die cut sample, at a cross-head displacement rate of 20 in/min. The specimen is clamped in a MTS (Mechanical Test Systems) electromechanical test frame which has data acquisition capability. The test is conducted at ambient condition. Results are reported as an average of at least five specimens.

It was surprisingly found that the tensile strength of micro-crosslinked TPU was increased up to 40% when 5% Lotador was pre-compounded with TPU and then used in injection molding. Sample data are shown in Table 1. As can be seen, the uniformity of the Lotader dispersion is critical. Pre-compounding produces more beneficial results than forming a dispersion by dry blend. The relative amounts of Lotader are not critical, provided that the concentration is still low enough to provide micro-crosslinking.

All pre-compounded master batches were still melt processable and extrudable. Without being bound to any particular theory, this indicates that small chemical crosslinking may happen either more in the inter molecules instead of intra molecular chains, or very low crosslinking density is present from a small percentage of functional groups. If Lotader epoxide rings were not opened for chemical crosslinking and were just physical blending with TPU, then this would result in a much lower tensile strength since Lotader functions as a typical plasticizer. It is known that the tensile strength of the Lotader is only 4 MPa.

Thus, it has been surprisingly found that micro-crosslinked TPU can be made with a functional polyolefin reacted with TPU during extrusion. As shown in FIG. 1, without being bound to any particular theory, it is proposed that the epoxide group of Lotader reacts with the —NH$_2$ linkage of TPU and forms chemical bonding either inter or intra molecules. Such chemical linkages form more or less locally because of the relative larger Lotader molecules with small percent epoxide functional groups to react, which results a low crosslinking degree in the TPU. The low crosslinking density of the TPU during the extrusion results in the micro-crosslinked TPU being melt processable/extrudable. The micro-crosslinked TPU showed greatly improved physical properties, which could be due to some of the TPU hard segment being reinforced by chemical micro-crosslinking. These results provide further opportunities to reduce the material basis weight due to the micro-crosslinked TPU being much stronger than TPU alone.

TABLE 1

Sample data.

| Sample | Formation Method | Tensile Strength (MPa) | Elongation (%) |
|---|---|---|---|
| 100% TPU | N/A | 20.7 | 770 |
| 95% TPU/5% Lotader 8900 | Pre-compounded | 28.5 | 960 |
| 90% TPU/10% Lotader 8900 | Pre-compounded | 28.2 | 910 |
| 90% TPU/10% Lotader 8900 | dry blended | 24.6 | 830 |
| Lotader 8900 | N/A | | 860 |

Solubility Test.

A solvent test was performed to evaluate the micro-crosslinked TPU. Visual transparencies of sample solutions were compared between initial mixing and after sitting overnight without stirring. All three sample solutions (1.0 gram of the sample dissolved in 10 mL solvent of THF) appeared to be clear after stirring one hour in room temperature. After sitting overnight without stirring, the pure TPU and Pure Lotader 8900 solutions were still completely clear. However, the sample from Lotader-reacted modified TPU in the middle bottle showed a fiber gel-like white cloud precipitate, which is due to micro crosslinking.

Figure 2:
FIG. 2 is an exemplary embodiment depicting a solvent test for TPU materials in accordance with the present disclosure. The left bottle, as seen in FIG. 2, is a pure TPU film which was completely soluble in tetrahydrofuran (THF), the middle bottle is 10% Lotader® ethylene acrylate based terpolymers pre-compounded with TPU used for injection molding sample which clearly showed some gel from the THF, and the right bottle is pure Lotader® ethylene acrylate based terpolymers completely soluble in THF shown for comparison.

The results are shown in FIG. 2. The left bottle is a pure TPU film which was completely soluble in THF, the middle bottle is 10% Lotader precompounded with TPU used for injection molding sample which clearly showed some gel from the THF, and the right bottle is pure Lotader completely soluble in THF shown for comparison.

Thermal Analysis.

The melt flow rate (MFR) is the weight of a polymer (in grams) forced through an extrusion rheometer orifice (0.0825-inch diameter) when subjected to a load of 2160 grams in 10 minutes, typically at 190° C., 210° C., or 230° C. Unless otherwise indicated, melt flow rate is measured in accordance with ASTM Test Method D1238 with a Tinius Olsen Extrusion Plastometer.

The glass transition temperature ($T_g$) is determined by dynamic mechanical analysis (DMA) in accordance with ASTM E1640-09. A Q800 instrument from TA Instruments is used. The experimental runs are executed in tension/tension geometry and in a temperature sweep mode in the range from −120° C. to 150° C. with a heating rate of 3° C./min. The strain amplitude frequency can be kept constant (2 Hz) during the test. Three independent samples are tested to obtain an average glass transition temperature, which is defined by the peak value of the tan δ curve, wherein tan δ is defined as the ratio of the loss modulus to the storage modulus (tan δ=E"/E').

The melting temperature is determined by differential scanning calorimetry (DSC). The differential scanning calorimeter in these tests is a DSC Q100 Differential Scanning Calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Delaware. To avoid directly handling the samples, tweezers or other tools are used. The samples are placed into an aluminum pan and weighed to an accuracy of 0.01 milligram on an analytical balance. A lid is crimped over the material sample onto the pan. Typically, the resin pellets are placed directly in the weighing pan.

The differential scanning calorimeter is calibrated using an indium metal standard and a baseline correction is performed, as described in the operating manual for the differential scanning calorimeter. A material sample is placed into the test chamber of the differential scanning calorimeter for testing, and an empty pan is used as a reference. All testing is run with a 55-cubic centimeter per minute nitrogen (industrial grade) purge on the test chamber. For resin pellet samples, the heating and cooling program is a 2-cycle test that began with an equilibration of the chamber to −50° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −50° C., followed by equilibration of the sample at −50° C. for 3 minutes, and then a second heating period at a heating rate of 10° C. per minute to a temperature of 200° C. All testing is run with a 55-cubic centimeter per minute nitrogen (industrial grade) purge on the test chamber.

The results are evaluated using the UNIVERSAL ANALYSIS 2000 analysis software program that identified and quantified the $T_g$ of inflection, the endothermic and exothermic peaks, and the areas under the peaks on the DSC plots. The $T_g$ is identified as the region on the plot-line where a distinct change in slope occurred, and the melting temperature is determined using an automatic inflection calculation.

DSC analysis indicated that the change in reaction heat was very small because the exothermal reaction from small percentages of the epoxide ring opening is very low and covered in a major phase transition of TPU hard segment. The rheology testing also indicated that the modules of the micro-crosslinked TPU are not changed significantly. This may reflect that the small percent of chemical crosslinking may happen more in inter molecules instead of intra molecular chains.

SUMMARY

It has been surprisingly found that micro-crosslinked polyurethane can be achieved through extrusion reactions of epoxide functional polyolefin (Lotader) with thermoplastic polyurethane. The resultant micro-crosslinked TPU is still melt processable (i.e. extrudable) without gelling or blocking the extruder, which is due to very low crosslinking density, less than about 1%, as showed in the solvent test. The micro-crosslinked TPU showed much improved physical properties; its tensile strength at break increased by about 40% even with only a small percentage of crosslinking among Lotader and TPU polymer chains.

The materials and methods described herein to form a micro-crosslinked TPU are broadly applicable to the development of high performance, low cost elastic materials. For example, a CD stretchable elastic laminate could be made by extruding a micro-crosslinked TPU and then laminating the extruded TPU with non-stretch bonded micro-crosslinked TPU film (filament) with facings following a ring rolling process. Such an elastic laminate would be stretchable in any direction, soft, strong, moisture-permeable, and useful in a wide variety of consumer products.

Example 2. Aliphatic Thermoplastic Polyurethane

Materials.

As used in this example, Lotader refers to Lotader® AX 8900 or 8700. Lotader® AX is a functional polyolefin. It is a reactive random terpolymer of ethylene, butyl acrylate, and glycidyl methacrylate (epoxide function) produced by Arkema through a high-pressure polymerization process. It contains methyl acrylate content of 24 wt % (as determined by FTIR), glycidyl methacrylate content 8 wt % (as determined by FTIR), and a melt index of 6 g/10 min (190° C./2.16 kg; ISO 1133/ASTM D1238). It can be reacted with —OH, —COOH, —NH₂, and —SH.

As used in this example, TPU refers to TPU Estane® AG 8451. TPU Estane® AG 8451 is an aliphatic polyether based TPU from Lubrizol.

Synthesis.

A small twin screw extruder (20 mm, Werner and Pfleidere Corporation, Ramsey, NJ), with 4 zones temperature from 380-400° F. and screw speed 150-200 rpm, was used to directly co-extrude TPU and functional polyolefin (10% AX 8700) into film.

Tensile properties were tested according to ASTM D882. In particular, the film samples were cut in the MD and CD with either 3×7" or 1×7" die, and tensile properties were measured with a gauge length of 1 inch using a MTS tensile machine according to the procedures of Example 1.

It was found that the tensile strength and elongation of the film showed about a 25-30% increase in CD and about a 10-15% increase in MD with epoxy based functional polyolefin AX 8700.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A modified thermoplastic polyurethane comprising:
   a polyurethane backbone; and
   a crosslinker comprising a functional polyolefin;
   wherein the modified thermoplastic polyurethane is extrudable.

2. The modified thermoplastic polyurethane of claim 1, wherein the polyurethane backbone comprises a first atom covalently bound by the crosslinker comprising a functional polyolefin to a second atom in the polyurethane backbone.

3. The modified thermoplastic polyurethane of claim 1, wherein, in the presence of an additional thermoplastic polyurethane, the polyurethane backbone comprises at least one atom covalently bound by the crosslinker comprising a functional polyolefin to at least one atom of the additional thermoplastic polyurethane.

4. The modified thermoplastic polyurethane of claim 1, wherein the modified thermoplastic polyurethane has a crosslinking density of less than about 2%.

5. The modified thermoplastic polyurethane of claim 1, wherein the polyurethane backbone comprises a hard segment and a soft segment.

6. The modified thermoplastic polyurethane of claim 1, wherein the polyurethane backbone comprises a functional group selected from the group consisting of an aliphatic group, an aromatic group, an ester group, an ether group, and combinations thereof.

7. The modified thermoplastic polyurethane of claim 1, wherein the crosslinker comprising a functional polyolefin reinforces the hard segment of the polyurethane backbone.

8. The modified thermoplastic polyurethane of claim 1, wherein the crosslinker comprising a functional polyolefin is selected from the group consisting of reactive random polymers, maleic anhydride, glycidyl methacrylate, random terpolymers of ethylene, acrylic maleic anhydride, glycidyl methacrylate, and combinations thereof.

9. The modified thermoplastic polyurethane of claim 1, wherein the functional polyolefin comprises a functional group selected from the group consisting of an epoxide group, maleic anhydride, a carboxylic acid, a blocked isocyanate, and combinations thereof.

10. The modified thermoplastic polyurethane of claim 1, wherein the modified thermoplastic polyurethane has an increased tensile strength of at least about 20% compared to an unmodified thermoplastic polyurethane.

11. The modified thermoplastic polyurethane of claim 1, wherein the modified thermoplastic polyurethane has an increased elongation in at least one direction of at least about 10% compared to an unmodified thermoplastic polyurethane.

12. An elastic article comprising the modified thermoplastic polyurethane of claim 1.

13. A consumer product comprising the modified thermoplastic polyurethane of claim 1, wherein the consumer product is selected from the group consisting of personal hygiene product, wipes, wound dressings, napkins, disposable bed liners, food packaging, baby and adult diaper products, feminine pads, arm bands, agricultural and pet products, and combinations thereof.

14. A method of reactively extruding a modified thermoplastic polyurethane, the method comprising:
   pre-compounding a mixture comprising:
      a molten polymer comprising a polyurethane backbone; and
      a molten crosslinker comprising a functional polyolefin; and
   extruding the mixture;
   wherein the polymer comprising a polyurethane backbone reacts with the crosslinker comprising a functional polyolefin during the method step of extruding the mixture; and
   wherein the mixture does not gel or block the extruder during the method step of extruding the mixture.

15. The method of claim 14, wherein the method step of pre-compounding a mixture occurs at a temperature in the range of from about 140° C. to 200° C.

16. The method of claim 14, wherein the method step of extruding the mixture occurs at a temperature in the range of from about 160° C. to 180° C.

17. The method of claim 14, wherein the polyurethane backbone comprises a functional group selected from the group consisting of an aliphatic group, an aromatic group, an ester group, an ether group, and combinations thereof.

* * * * *